June 11, 1968  G. EGGSTEIN ET AL  3,387,687
DISC BRAKE CALIPER MOUNTING MEANS
Filed June 3, 1966  2 Sheets-Sheet 2
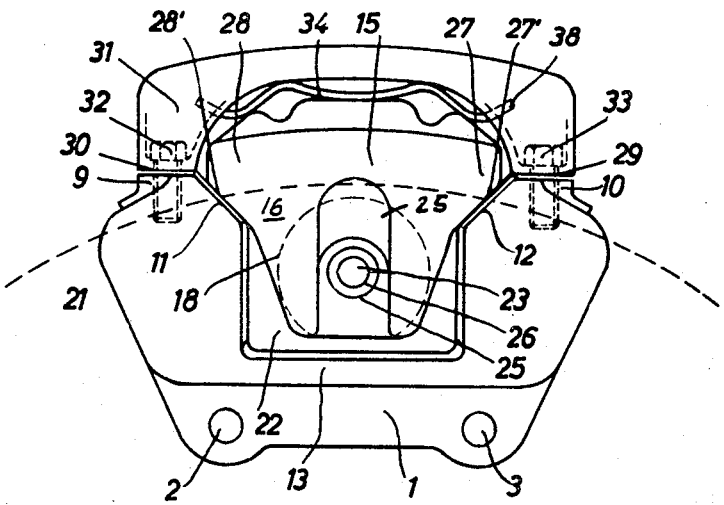
Fig. 4
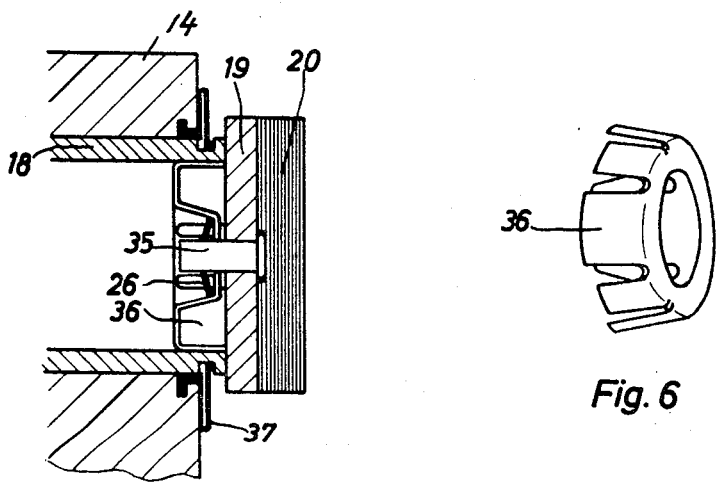
Fig. 5
Fig. 6
INVENTORS
GIORGIO EGGSTEIN
ERICH SCHAEFTNER
BY Michael S. Striker
ATTORNEY 3,387,687
DISC BRAKE CALIPER MOUNTING MEANS
Giorgio Eggstein, Turin, Italy, and Erich Schaeftner, Stuttgart-Zuffenhausen, Germany, assignors to Ernst Heinkel Aktiengesellschaft, Stuttgart-Zuffenhausen, Germany
Filed June 3, 1966, Ser. No. 555,939
Claims priority, application Germany, June 4, 1965, H 56.227
9 Claims. (Cl. 188—73)

ABSTRACT OF THE DISCLOSURE

A U-shaped carrier has a divided yoke, and arms guiding the supporting means of a pair of brake members located on opposite sides of a brake disc which projects through the gap of the divided yoke into the space between the carrier arms and between the brake members.

Background of the invention

The present invention relates to a brake arrangement, and more particularly to a brake arrangement in which the brake cylinder and the brake members are mounted floating on a fixedly mounted saddle-shaped carrier.

Saddle-shaped or U-shaped carriers for disc brakes are known in which the brake cylinder is fixedly mounted on the fixed carrier.

In the construction of a disc brake, the space taken up by the brake arrangement is essential. Particularly if the brakes are provided at the front wheels of a vehicle, such as a motor car, it is important that the brake arrangement takes up only little space in lateral direction. Furthermore, the saddle-shaped carrier of the brake should cover only a small sector or portion of the brake disc, since otherwise cooling of the rotary brake disc by the stream of air along the car is prevented. Therefore, it is not possible to increase the dimensions of the brake arrangement in the direction of the brake disc.

It has been proposed to provide a disc brake with a floating saddle-shaped carrier. In this construction, the brake cylinder is mounted on one arm of the carrier, and the carrier is shiftable in the direction of the axis of the rotary brake disc. One brake member is fixed to one arm of the carrier, while the other brake member is operated by the piston to engage the brake disc. Although this construction has certain advantages, it has not been fully successful since it is difficult to axially guide the carrier.

In view of the very great forces developed during a power assisted braking operation, the guiding of the carrier is a difficult problem. It can hardly be avoided that water and dirt enter the guideways which causes jamming of the apparatus. Furthermore, due to the spatial position of the guide means in relation to the point in which the resultant of the brake forces acts, torques develop which cause an edging of the guide means and jamming of the device. Particularly, in an emergency braking operation, a jamming of the guide means and edging of the guided body not only use up a great part of the applied brake force, but also delay the release of the brake so that the temperatures in the fluid system of the brake increases to such an extent as to cause complete failure of the brake.

It has been proposed to overcome the disadvantages of a brake having a floating saddle-shaped carrier, particularly by placing the guide means in such a manner in relation to the points at which the brake forces act, that the torques developed during a braking operation are reduced. However, it has not been possible to eliminate the dangerous consequences of corrosion and dirt accumulated in the guideways. This is not possible for a movably mounted saddle-shaped carrier, because the substantially greater dimensions of the carrier as compared with the surfaces of the brake members, which transfer the brake forces, always leads to edging and distortions of the floating carrier, resulting in turn in edging of the guide means.

Summary of the invention

It is one object of the invention to overcome the disadvantages of known brake arrangements, and to provide a reliably operating brake arrangement which is not subject to disturbances due to the entry of water or dirt into guideways.

Another object of the invention is to provide a brake arrangement in which a U-shaped carrier is fixedly mounted on the frame of a car, while a braking device including a brake cylinder and a pair of brake members "floats" or is movably supported on the carrier.

Another object of the invention is to mount a brake device including actuating means and brake members for sliding movement in the direction of the applied brake force on a fixed carrier. A brake arrangement according to one embodiment of the invention comprises a carrier having elongated guide means forming a path; supporting means disposed on the guide means for movement along the path and including first and second supports; brake actuating means, preferably cylinder and piston means, mounted on the first support and including an actuating member movable in an actuating direction toward the second support; first and second brake members respectively mounted on the actuating member and on the second support; and a brake means, such as a rotary brake disc, mounted for rotation about an axis and being fixed in the actuating direction. A portion of the brake disc is located between the first and second brake members so as to be engaged by the first brake member when the actuating member moves with the same in the actuating direction. Thereupon the supporting means moves with the second brake member in the opposite direction due to the force applied by the actuating member on the first support. When the second brake member abuts the brake disc, the movement of the supporting means on the guide means of the carrier is terminated. Since the brake forces act in the direction of the guide means, no jamming or edging can take place.

In the preferred embodiment of the invenution, the carrier is U-shaped and has a connecting portion and a pair of arms on opposite sides of a space. The arms have confronting elongated first guide faces inclined toward each other transverse to the longitudinal direction and approach each other toward the above-mentioned space. A connecting bridge connects the free ends of the arms so that the construction is very rigid.

The supporting means include a guide portion having a pair of second guide faces inclined toward each other and slidingly disposed on the first guide faces. Preferably, guide sheets of a nonferrous metal, or of an artificial synthetic material are located between the first and second guide faces to increase the friction between the same. Due to this arrangement, the supporting means of the brake cylinder are supported after each braking operation in the position determined by the wearing off of the brake linings. The brake members are mounted on the actuating piston and on the second support so as to be easily detachable from the same.

Even if there is a lever arm between the guide faces and the point at which the brake forces act, the guide means according to the invention prevent a jamming or edging, and therefore the entry of dirt or water into the guide means. When the U-shaped carrier yields resiliently under a great braking force, and the arms with the guide faces are slightly spread apart, the sliding engagement between the first and second guide faces is maintained while the first and second guide faces move transversely to each other, with the supporting means moving farther into the space between the arms of the U-shaped carrier when the arms of the same are spread, and farther out of the space when the arms of the carrier resiliently move back toward each other. Due to the constant engagement between the first and second guide faces, there is no room for the entry of dirt and water.

During each braking operation, the brake cylinder is always in a position in which the longitudinal axis of the brake piston is perpendicular to the surface of the brake disc, since the piston urges the respective brake member against the surface of the rotray brake disc while a reaction force displaces the cylinder with the entire supporting means along the guide means. The brake pressure itself causes an abutment of the entire end face of the lining of the brake member on the surface of the brake disc.

While in accordance with the prior art, the guide means of brakes employing floating carriers were constructed as precisely as possible to provide no room for the entry of dirt, and for avoiding edging and jamming, the present invention does not operate on this principle, but permits the supporting means of the brake cylinder and brake members to have freedom of movement in three transverse directions so that a "breathing" and relative movement of the individual parts of the arrangement does not cause edging or jamming so that the operation of the guide means is not affected even when very great brake forces develop in emergency stops.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 4 is a front view of a preferred embodiment of the brake arrangement;

FIG. 5 is a fragmentary sectional view illustrating a detail of the construction shown in FIG. 3; and FIG. 6 is a perspective view illustrating a spring cap used in the construction shown in FIG. 5.

*Description of the preferred embodiment*

Figure 1:
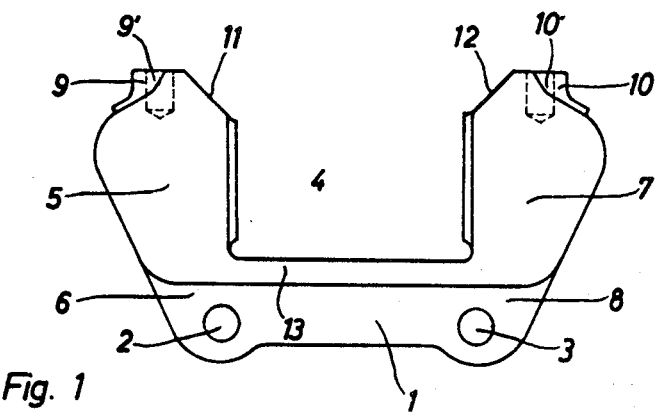
FIG. 1 is an elevation illustrating a carrier forming part of a preferred embodiment of the brake arrangement according to the invention.
Figure 2:
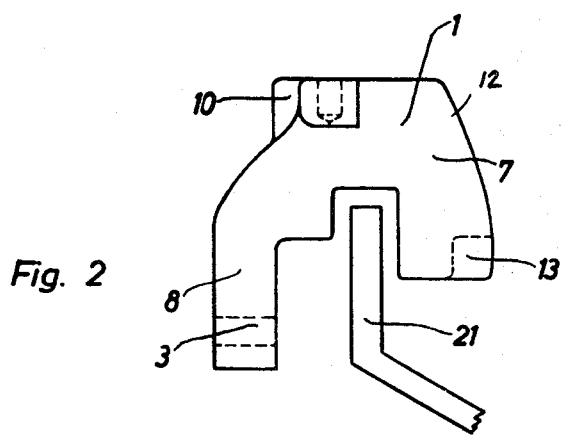
FIG. 2 is a front view of the carrier shown in FIG. 1, and also illustrating a brake disc.

Referring now to the drawings, the carrier 1 illustrated in FIGS. 1, 2 and 4 is U-shaped and has a pair of arms 5, 6 and 7, 8, respectively, connected by a divided yoke. The arms comprise shorter portions 7, 5 connected by a first yoke portion 13, and longer portions 6, 8 which are also connected to each other by a second yoke portion which has bores 2 and 3 by which carrier 1 is secured to the frame of a vehicle, such as a motor car, which is provided with a brake arrangement according to the invention. The two yoke portions define between each other a gap, extended into recesses formed between connecting portions 5 and 6, and 7 and 8. A peripheral portion of a brake disc 21 is located in the gap, as best seen in FIG. 2. Carrier 1 defines between arms 5, 6 and 7, 8 a substantially rectangular space 4. The free ends of arms 5, 6 and 7, 8 are provided with bosses 9 and 10 having threaded bores 9' and 10' permitting the attachment of a connecting means 31 by screws 32 and 33, as shown in FIG. 4. Corresponding abutment faces are provided at the ends of connecting means 31 and on bosses 9, 10.

Elongated guide faces 11 and 12 are provided on the free ends of the arms 5, 6 and 7, 8 slanted at an angle of substantially 45° to a vertical plane of symmetry and approaching each other toward space 4. Guide faces 11 and 12 form a guideway on which the structure illustrated in FIG. 3 is supported by means of other guide faces 27', 28', as best seen in FIG. 4.

Figure 3:
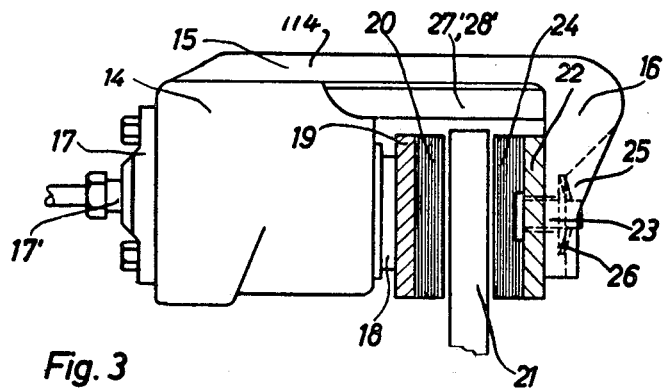
FIG. 3 is a front view of another part of the brake arrangement including supporting means for a pair of brake members.

Referring now to FIG. 3, a supporting means 114 includes a first support in the form of a cylinder 14, and a second support 16, and a connecting arm 15 extending parallel to guide faces 27', 28' between support 14 and support 16. Prismatic portions 27, 28 project downwardly from arm 15 and have the pair of inclined guide faces 27', 28' by which support 114 is supported on guide faces 11, 12 for sliding movement along a path extending along the length of guide faces 11, 12. A spring 34, see FIG. 4 has ends inserted into bores 38 of connecting means 31, and a central portion abutting the top face of arm 15 to urge supporting means 114 into sliding engagement with guide faces 11, 12.

However, in the preferred embodiment of the invention, guide sheets 29, 30 are located between guide faces 11 and 28', and between guide faces 12 and 27'. The guide sheets preferably consist of a nonferrous metal or of a plastic, and are bent an angle of substantially 135° so that portions of guide sheets 29, 30 are located between the abutting faces between connecting means 31 and bosses 9 and 10.

Support 14 forms a hydraulic cylinder in whose bore the hollow piston 18 is mounted, as best seen in FIG. 5. Cylinder 14 is closed at one end by cover plate 17 which has a connecting tube 17' to which a hose is attached for supplying a pressure fluid into the bore of cylinder 14. A resilient cap 36, best seen in FIGS. 5 and 6, closes the end of the hollow piston 18 and has a central opening into which a shaft portion 35 of a brake member 19 projects, so that brake member 19 is detachably secured to piston 18. An annular rubber collar 37 has portions located in corresponding annular recesses of cylinder 14 and piston 18 to prevent dirt and water to enter the cylinder 4.

As best seen in FIG. 3, brake member 19 carries a brake lining 20 which is located on one side of a portion of a rotary brake disc 21 which is secured to a shaft, not shown, to be braked. On the other side of portion 21, the lining 24 of a second brake member 22 is located. Brake member 22 has a projecting shaft portion 23 located in a bore of support 16 and secured to the same by a pin 26. Prismatic portions 27, 28 are located on opposite sides of arm 15 and have on the outside thereof the inclined guide faces 27', 28' which slidingly engage the portions of guide sheets 29, 30 which are located on guide faces 11, 12. Support 16 has a recess 25 in which the end of shaft 23 and pin 26 are located so that the same are accessible for easy removal of brake member 22, 24, 23.

As explained above, the entire assembled brake arrangement is secured to the frame of a motor car by bolts passing through openings 2 and 3 in carrier 1. The free ends of the arms 7, 8 and 5, 6 are connected by connecting means 31 so that only extremely great forces could spread the arms and thereby guide faces 11, 12 apart.

When a fluid is admitted under pressure into the cylinder 14 which forms a support for brake member 19, 20, the same is urged by piston 18 into engagement with portion 21 of the rotating brake disc which cannot move in axial direction. Consequently, support cylinder 14 is urged away from brake member 19, 20 and moves with arm 15 and support 16 to the left as viewed in FIG. 3 until lining 24 of brake member 22 also abuts portion 21 of the brake disc. The axial movement of supporting means 114 relative to the carrier is possible since the guide faces 27', 28' slide in longitudinal direction along the path formed by guide sheets 29, 30 on guide faces 11, 12. Guide faces 28' and 27' are urged by spring 34 against the guide sheets 29 and 30, so that the longitudinal motion of supporting means 114 braked by the frictional engagement between guide faces 28', 27' and the guide sheets 30, 29.

Since the rotary brake disc 21 wobbles slightly, brake members 19, 20 and 22, 24 are moved apart fractions of a millimeter when no pressure is produced in cylinder 14. In this manner, brake member 19, 20 urges piston 18 back into cylinder 14, such movement being braked by the frictional engagement between guide sheets 29, 30 and guide faces 27' and 28'. This function of guide sheets 29, 30 is of importance, since it compensates automatically for the reduced thickness of brake linings 29, 24 after prolonged wear.

Since very great braking forces are produced, particularly when the brake is power operated, the carrier 1 is slightly deformed. Deformation of a saddle-shaped carrier is an important and difficult problem of disc brakes, and is the reason that prior art constructions employing so-called "floating" saddle-shaped carriers have been unsuccessful.

In the construction of the present invention, a slight deformation of the saddle-shaped carrier 1 by tangential force transmitted from brake disc 21 to the brake members is not entirely eliminated, but all detrimental effects of such a deformation are avoided. Particularly in emergency stops, when the elastic deformation of the carrier exceeds certain limits, the prior art constructions did not prevent a permanent deformation of the carrier after an emergency stop producing very great braking forces. Guide bolts, guide grooves, and other guide means may jam and render the brake inoperative in the constructions of the prior art.

In the present invention, the elastic deformation of the carrier 1 will have no influence on the function of the brake, even if a permanent elastic deformation is caused by extremely great braking forces. If the space 4 between the arms of U-shaped carrier 1 is widened by moving apart of the arms 5, 6 and 7, 8, the support 114 with the brake members will be permitted by the farther spaced guide faces 11, 12 to move transversely deeper into the space 4, but the sliding engagement between the faces 27', 28' and guide sheets 29, 30 will be maintained, and the brake operations will take place as before. No dirt or water can enter in between the engaging guide faces which remain in contact. Of course, no jamming can take place since the deformation of carrier 1 is caused in a direction transverse to the direction of movement of supporting means 114 when the brake members have pressed against the brake disc.

The braking device shown in FIG. 3 is guided only along two lines, and a third guideway is purposely omitted, since a third guideway would limit transverse movement of the brake device and may cause jamming. Supporting means 114 cannot edge or bind in the direction of the guide means since in the inoperative position, the distance between lining 20 and portion 21 of the brake disc, is only a fraction of a millimeter. In the moment in which actuating piston presses brake member 19, 20 against brake disc 21, the surface of brake lining 20 will abut the corresponding surface of portion 21, and actuating piston 18 and thereby cylinder 14 will be held in a position in which the axis of the piston and cylinder is exactly perpendicular to the surface of the rotary brake disc 21 since the entire surface of the brake lining abuts the surface of the brake disc 21. The resilient cap 36 permits brake member 19, 20 to assume a position fully abutting brake disc 21.

Not only guide sheets 29, 30, but also spring 34 participate in the slowing down of the rearward movement of brake cylinder 14 since the center portion of spring 34 slides on the top face of arm 15 of supporting means 14 when the same is slightly displaced together with brake member 22, 24 upon engagement of the brake disc 21 by brake member 19, 20. When the pressure is relieved in cylinder 14, the wobbling motion of brake disc 21 moves brake members 18, 20 and 22, 24 slightly apart so that surfaces 27', 28' slide on guide sheets 29, 30, and the top face of arm 15 slides on spring 34 with a certain friction so that the brake members cannot move too far apart.

The provision of non-corroding guide sheets 29, 30 prevents any corrosion of the guide faces 11, 12 which are a frequent cause of jamming of prior art brake arrangements, particularly after a time of non-use of the brake.

A particular advantage of the brake arrangement according to the invention is that exchange or servicing of the brake members is very easily accomplished by unskilled workers. This is of particular importance for disc brakes, since the linings of disc brakes are far sooner worn off than in drum brakes. It is desirable that the brake members can be exchanged without disassembly of the hydraulic connections, or even loosening of the hydraulic connections, since this requires a skilled worker.

In accordance with the invention, the brake members can be exchanged after loosening screws 32, 33 and removal of connecting bridge means 31. Spring 34 is mounted on connecting bridge means 31, and is removed with the same. When the connecting bridge means 31 is detached, the supporting means 114 is lifted off the guide means 11, 12, spring pin 26 is pulled out of shaft 23, and brake member 22, 24 can be easily detached. Since brake disc 21 is no longer located between the brake members, shaft 35 of brake member 19, 20 can be pulled out of cap 36 after removal of spring pin 26 and later replaced. Supporting means 114 is then again placed on guide sheets 29, 30 and the connecting bridge 31 attached by screws 32 and 33. It is not necessary to detach the pressure hose from tubular member 17', since the flexible hose permits the detachment of support 114 with the brake members from carrier 1.

From the above description it is evident that the floating support means 114 with the brake cylinder and the brake members transmits the forces produced by the pressure fluid in cylinder 14 to the brake disc, while such forces do not act at all on the carrier 1. The brake forces act exclusively in the direction of the axis of cylinder 14 and piston 18, and since there is no positive connection between supporting means 114 and carrier 1 with connecting bridge 31 in this direction, no axial brake forces can be transmitted to the carrier. Deformation of the brake disc 21 and of the wheel axle carrying the same, which can be substantial when a great force is applied for stopping the car in an emergency, are transmitted to carrier 1 only in the direction of the movement of the car due to the transmission of a force from the brake disc 21 onto the brake members in the direction of rotation. An edging in the longitudinal direction of the guide means and carrier is not possible, since the brake cylinder 14 and the brake members are always oriented by the brake pressure so that the axis of piston 18 and cylinder 14 extends perpendicular to the face of brake disc 21 confronting brake lining 20. Consequently, no buckling torque can develop.

The tendency of the brake disc to take along the brake members in the direction of rotation produces pressure on the respective arms 5, 6 or 7, 8 which causes a slight spreading of the arms which are resiliently deformed. When the brake action is terminated, the arms return resiliently to the normal position in a motion which is sometimes referred to as "breathing." The support and guidance of guide faces 27', 28' on the respective guide faces of the carrier is not detrimentally influenced since the guide faces remain in sliding engagement while the guide faces 27', 28' move downward into the recess as permitted by the greater transverse spacing of the spread arms of the carrier.

It will be understood that each of the elements described above, or two or more together, may also find a useful application in other types of brake arrangements differing from the types described above.

While the invention has been illustrated and described as embodied in a brake arrangement in which the support of the brake members and of the brake cylinder is mounted for sliding movement in axial direction of a rotating brake disc on a saddle-shaped carrier, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Brake arrangement, comprising, in combination, U-shaped carrier means including two yoke portions forming a gap between each other and two arms having each two connecting portions respectively connected with said yoke portions and defining between each other extensions of said gap, said arms having free ends having elongated guide means inclined towards each other and forming a path; supporting means disposed between said arms mounted on said guide means for sliding movement along said path and including first and second supports spaced along said path; a resilient spring arrangement mounted on at least one of said arms and slidingly engaging said supporting means for urging the same into engagement with said guide means; brake actuating means mounted on said first support and including an actuating member movable parallel to said path in an actuating direction toward said second support; first and second brake members respectively mounted on said actuating member and on said second support and disposed on opposite sides of said gap; and a brake means mounted for rotation about an axis extending parallel to said path and being fixed in said actuating direction, said brake means having a portion located in said gap and between said first and second brake members so as to be engaged by said first brake member when said actuating member moves with said first brake member in said actuating direction whereupon said supporting means moves with said second brake member in the opposite direction along said guide means until said second brake member abuts said brake means.

2. A brake arrangement comprising, in combination, U-shaped carrier means including two yoke portions forming a gap between each other and two arms on opposite sides of a space and having each two connecting portions respectively connected with said yoke portions and defining between each other extensions of said gap, said arms having confronting elongated first guide faces forming a path, said first guide faces being inclined toward each other transverse to said path and approaching each other toward said space; connecting means transverse to said path and connecting the free ends of said arms; a brake disc mounted for rotation about an axis extending parallel to said path and being fixed in axial direction, said brake disc having a portion located in said space and in said gap; first and second brake members located on opposite sides of said portion and of said gap; supporting means including a guide portion having a pair of second guide faces inclined toward each other and slidingly disposed on said first guide faces so that said supporting means is mounted on said carrier means for movement along said path, said supporting means further including first and second supports spaced along said path, said second support carrying said second brake member; spring means abutting said connecting means and said supporting means for urging said second guide faces against said first guide faces; and actuating means mounted on said first support and including an actuating member movable along said path in an actuating direction toward said second support, said actuating member carrying said first brake member and moving the same in said actuating direction to a position engaging said portion of said brake disc so that said supporting means moves with said second brake member in an opposite direction along said first guide faces until said second brake member abuts said portion whereby braking forces transmitted to said arms and spreading the same slightly apart do not act on said supporting means which moves under the action of said spring means transverse to said first guide faces farther into said space.

3. A brake arrangement according to claim 2 wherein said first support includes a brake cylinder; wherein said actuating means include means for supplying a pressure fluid into said cylinder; wherein said actuating member is a piston mounted in said cylinder and carrying said first brake member; wherein said second support and said first support are connected by an arm having said second guide faces; and wherein said second support is located opposite said first support so that said brake members are aligned and located on opposite sides of said brake disc.

4. A brake arrangement according to claim 2 wherein said supporting means rests with said second guide faces on said first guide faces of said carrier means; and including guide sheets of a nonferrous material located between said first and second guide faces; and wherein said spring means is mounted on said connecting means and has a portion slidingly engaging said supporting means.

5. A brake arrangement according to claim 4 wherein said spring means is a leaf spring having ends mounted in recesses of said connecting means, and a central portion located in a plane of symmetry of said first and second guide faces and slidingly engaging said supporting means; and wherein said brake members have shaft portions detachably mounted on said actuating member and said second support, respectively.

6. A brake arrangement as claimed in claim 3, wherein said piston has a tubular wall having an open end, including a resilient cap inserted into said open end and having a tubular central holding portion; wherein said first brake member has a shaft located in said holding portion, and means for detachably holding said shaft in said holding portion.

7. A brake arrangement as claimed in claim 3, wherein said piston has an annular recess adjacent one end of said brake cylinder, said end having another annular recess; and an elastic collar located in said recesses.

8. Brake arrangement, comprising, in combination, U-shaped carrier means including two yoke portions forming a gap between each other and two arms having each two connecting portions respectively connected with said yoke portions defining between each other extensions of said gap, said arms having free ends having confronting elongated guide faces inclined toward each other and approaching each other toward said yoke portions, said guide faces forming a path; supporting means disposed between said arms and mounted on said guide faces for movement along said path and including first and second supports spaced along said path; connecting bridge means secured to the ends of said arms spaced from said guide faces; spring means mounted on said connecting bridge means and slidingly engaging said supporting means for urging the same into engagement with said guide faces;

brake actuating means mounted on said first support and including an actuating member movable parallel to said path in an actuating direction toward said second support; first and second brake members respectively mounted on said actuating member and on said second support, and disposed on opposite sides of said gap; and a brake means mounted for rotation about an axis extending parallel to said path and being fixed in said actuating direction, said brake means having a portion located in said gap between said first and second brake members so as to be engaged by said first brake member when said actuating member moves with said first brake member in said actuating direction whereupon said supporting means moves with said second brake member in the opposite direction along said guide means until said second brake member abuts said brake means.

9. A brake arrangement according to claim 8 wherein said brake means is a rotary brake disc having said portion adjacent the periphery thereof, said brake disc having an axis of rotation extending parallel to said elongated guide means.

References Cited

UNITED STATES PATENTS

| 3,220,513 | 11/1965 | Hockinson | 188—73 |
| 3,236,335 | 2/1966 | Dowell | 188—73 |
| 3,260,332 | 7/1966 | Wells | 188—73 |

FOREIGN PATENTS

| 625,643 | 12/1962 | Belgium. |
| 1,313,957 | 11/1962 | France. |
| 1,189,333 | 3/1965 | Germany. |

MILTON BUCHLER, *Primary Examiner.*

G. E. A. HALVOSA, *Assistant Examiner.*